(12) United States Patent  
Stokkeland et al.

(10) Patent No.: US 7,800,976 B2
(45) Date of Patent: Sep. 21, 2010

(54) SINGLE FOIL LATERAL FORCE AND DEPTH CONTROL DEVICE FOR MARINE SEISMIC SENSOR ARRAY

(75) Inventors: Jan Erik Stokkeland, Heggedal (NO); Jon Falkenberg, Jar (NO)

(73) Assignee: PGS Geophysical AS, Lysaker (NO)

( * ) Notice: Subject to any disclaimer, the term of this patent is extended or adjusted under 35 U.S.C. 154(b) by 623 days.

(21) Appl. No.: 11/823,788

(22) Filed: Jun. 28, 2007

(65) Prior Publication Data

US 2009/0003129 A1 Jan. 1, 2009

(51) Int. Cl.
*G01V 1/38* (2006.01)
(52) U.S. Cl. .......................................... 367/16; 367/17
(58) Field of Classification Search ............... 367/15–17
See application file for complete search history.

(56) References Cited

U.S. PATENT DOCUMENTS

| | | | |
|---|---|---|---|
| 3,611,975 A * | 10/1971 | Ashbrook | 114/245 |
| 4,676,183 A * | 6/1987 | Conboy | 114/245 |
| 5,443,027 A | 8/1995 | Owsley et al. | |
| 6,011,752 A | 1/2000 | Ambs et al. | |
| 6,144,342 A | 11/2000 | Bertheas et al. | |
| 6,233,828 B1 | 5/2001 | Regueiro | |
| 6,525,992 B1 | 2/2003 | Olivier et al. | |
| 6,671,223 B2 | 12/2003 | Bittleston | |
| 6,879,542 B2 | 4/2005 | Soreau et al. | |
| 6,932,017 B1 | 8/2005 | Hillesund et al. | |
| 6,985,403 B2 | 1/2006 | Nicholson | |
| 7,080,607 B2 | 7/2006 | Hillesund et al. | |
| 7,092,315 B2 | 8/2006 | Olivier | |
| 7,222,579 B2 | 5/2007 | Hillesund et al. | |
| 7,423,929 B1 * | 9/2008 | Olivier | 367/17 |
| 2004/0008579 A1 | 1/2004 | Olivier et al. | |
| 2005/0078554 A1 | 4/2005 | Bittleston | |
| 2005/0209783 A1 | 9/2005 | Bittleston | |
| 2006/0227657 A1 | 10/2006 | Tveide et al. | |
| 2007/0064528 A1 | 3/2007 | Metzbower et al. | |
| 2008/0192570 A1 * | 8/2008 | Tenghamn et al. | 367/17 |

FOREIGN PATENT DOCUMENTS

WO WO 02/47968 6/2002

\* cited by examiner

*Primary Examiner*—Mark Hellner
(74) *Attorney, Agent, or Firm*—E. Eugene Thigpen; Richard A. Fagin

(57) ABSTRACT

A lateral force and depth control device for a marine streamer includes a housing configured to be coupled within the streamer. A control surface is mounted to the housing such that a rotary orientation and an angle of attack of the control surface with respect to the housing are changeable. The device includes means for moving the control surface to a selected rotary orientation with respect to the housing. The device includes means for moving the control surface to a selected angle of attack with respect to the housing. A removable coupling is provided to couple the control surface to the means for moving to a selected rotary orientation and means for moving to a selected angle of attack.

16 Claims, 4 Drawing Sheets

SINGLE FOIL LATERAL FORCE AND DEPTH CONTROL DEVICE FOR MARINE SEISMIC SENSOR ARRAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of marine seismic surveying. More particularly, the invention relates to devices for controlling lateral position and depth of seismic streamers.

2. Background Art

Marine seismic surveying systems are used to acquire seismic data from Earth formations below the bottom of a body of water, such as a lake or the ocean. Marine seismic surveying systems typically include a seismic vessel having onboard navigation, seismic energy source control, and data recording equipment. The seismic vessel is typically configured to tow one or more streamers through the water. At selected times, the seismic energy source control equipment causes one or more seismic energy sources (which may be towed in the water by the seismic vessel or by another vessel) to actuate. Signals produced by various sensors on the one or more streamers are ultimately conducted to the recording equipment, where a record with respect to time is made of the signals produced by each sensor (or groups of such sensors). The recorded signals are later interpreted to infer the structure and composition of the Earth formations below the bottom of the body of water.

The one or more streamers are in the most general sense long cables that have seismic sensors disposed at spaced apart positions along the length of the cables. A typical streamer can extend behind the seismic vessel for several kilometers. Because of the great length of the typical streamer, the streamer may not travel entirely in a straight line behind the seismic vessel at every point along its length due to interaction of the streamer with the water and currents in the water, among other factors.

More recently, marine seismic acquisition systems have been designed that include a plurality of such streamers towed by the seismic vessel in parallel. The streamers are towed by the vessel using towing devices, and associated equipment that maintain the streamers at selected lateral distances from each other as they are towed through the water. Such multiple streamer systems are used in what are known as three dimensional and four dimensional seismic surveys. A four dimensional seismic survey is a three dimensional survey over a same area of the Earth's subsurface repeated at selected times. The individual streamers in such systems are affected by the same forces that affect a single streamer.

The quality of images of the Earth's subsurface produced from three dimensional seismic surveys is affected by how well the positions of the individual sensors on the streamers are controlled. The quality of images generated from the seismic signals also depends to an extent on the relative positions of the seismic receivers being maintained throughout the seismic survey. Various devices are known in the art for positioning streamers laterally and/or at a selected depth below the water surface. U.S. Pat. No. 5,443,027 issued to Owsley et al., for example, describes a lateral force device for displacing a towed underwater acoustic cable that provides displacement in the horizontal and vertical directions. The device has a hollow spool and a rotationally mounted winged fuselage. The hollow spool is mounted on a cable with cable elements passing therethrough. The winged fuselage is made with the top half relatively positively buoyant and the bottom half relatively negatively buoyant. The winged fuselage is mounted about the hollow spool with clearance to allow rotation of the winged fuselage. The difference in buoyancy between the upper and lower fuselage maintains the device in the correct operating position. Wings on the fuselage are angled to provide lift in the desired direction as the winged fuselage is towed through the water. The device disclosed in the Owsley et al. patent provides no active control of direction or depth of the streamer, however.

U.S. Pat. No. 6,011,752 issued to Ambs et al. describes a seismic streamer position control module having a body with a first end and a second end and a bore therethrough from the first end to the second end for receiving a seismic streamer. The module has at least one control surface, and at least one recess in which is initially disposed the at least one control surface. The at least one control surface is movably connected to the body for movement from and into the at least one recess and for movement, when extended from the body, for attitude adjustment. Generally, the device described in the Ambs et al. patent is somewhat larger diameter, even when closed, than the streamer to which it is affixed, and such diameter may make spooling and unspooling the streamer difficult when deploying and retrieving streamers from the water.

U.S. Pat. No. 6,144,342 issued to Bertheas et al. describes a method for controlling the navigation of a towed seismic streamer using "birds" affixable to the exterior of the streamer. The birds are equipped with variable-incidence wings and are rotatably fixed onto the streamer. Through a differential action, the wings allow the birds to be turned about the longitudinal axis of the streamer so that a hydrodynamic force oriented in any given direction about the longitudinal axis of the streamer is obtained. Power and control signals are transmitted between the streamer and the bird by rotary transformers. The bird is fixed to the streamer by a bore closed by a cover. The bird can be detached automatically as the streamer is raised so that the streamer can be wound freely onto a drum. The disclosed method purportedly allows the full control of the deformation, immersion and heading of the streamer.

There continues to be a need for a lateral force and depth control device for marine seismic streamers to maintain depth and heading of the streamers along their length.

SUMMARY OF THE INVENTION

One aspect of the invention is a lateral force and depth control device for a marine streamer. Such a device includes a housing configured to be coupled within the streamer. A control surface is mounted to the housing such that a rotary orientation and an angle of attack of the control surface with respect to the housing are changeable. The device includes means for moving the control surface to a selected rotary orientation with respect to the housing. The device includes means for moving the control surface to a selected angle of attack with respect to the housing. A removable coupling is provided to couple the control surface to the means for moving to a selected rotary orientation and means for moving to a selected angle of attack.

A marine seismic acquisition system according to another aspect of the invention includes a seismic vessel and a plurality of seismic streamers, each coupled at a forward end to towing equipment coupled to the seismic vessel. The towing equipment maintains the forward ends of the streamers at selected lateral positions behind the vessel. The streamers each include a plurality of seismic sensors thereon at spaced apart positions. The streamers each include at least one lateral force and depth control device at a selected longitudinal position along the streamer. Each such device includes a housing configured to be coupled within the streamer, a control surface mounted to the housing such that a rotary orientation and an angle of attack of the control surface with respect to the housing are changeable, means for moving the control surface to a selected rotary orientation with respect to the housing, means for moving the control surface to a selected angle of attack with respect to the housing, and a removable coupling to couple the control surface to the means for moving to a selected rotary orientation and to the means for moving to a selected angle of attack.

Other aspects and advantages of the invention will be apparent from the following description and the appended claims.

DETAILED DESCRIPTION

Figure 1:
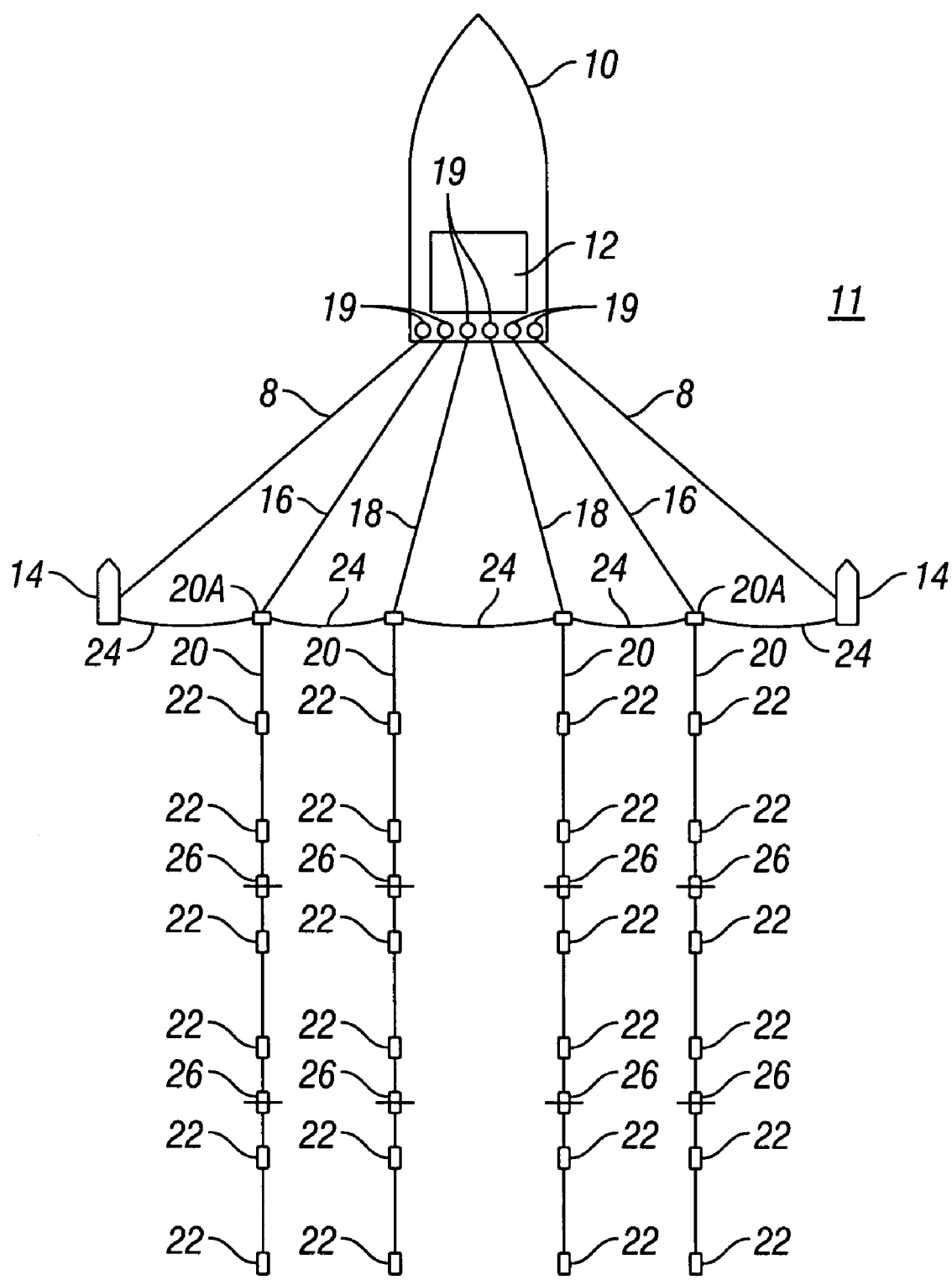
FIG. 1 shows a marine seismic acquisition system using single foil lateral force and depth ("LFD") control devices according to one embodiment of the invention.

FIG. 1 shows a typical marine seismic survey system that can include a plurality of streamers. Each of the streamers can be guided through the water by one or more single foil lateral force and depth ("LFD") control devices cooperatively engaged with each of the streamers. The seismic survey system includes a seismic vessel 10 that moves along the surface of a body of water 11 such as a lake or the ocean. The seismic vessel 10 may include thereon equipment, shown at 12 and for convenience collectively called a "recording system." The recording system 12 typically includes a recording unit for making a record with respect to time of signals generated by various seismic sensors in the acquisition system. The recording system 12 also typically includes navigation equipment to determine at any time the position of the vessel 10 and each of a plurality of seismic sensors 22 disposed at spaced apart locations on streamers 20 towed by the vessel 10. The foregoing elements of the recording system 12 are familiar to those skilled in the art and are not shown separately in the figures herein for clarity of the illustration.

The seismic sensors 22 can be any type of seismic sensor known in the art such as velocity sensors, acceleration sensors, pressure sensors, pressure time gradient sensors or any combination thereof. The seismic sensors 22 measure seismic energy primarily reflected from various structures in the Earth's subsurface below the bottom of the water 11. The seismic energy originates from a seismic energy source (not shown) deployed in the water 11. The seismic energy source (not shown) may be towed in the water 11 by the seismic vessel 10 or a different vessel (not shown). The recording system 12 may also include seismic energy source control equipment (not shown separately).

In the seismic survey system shown in FIG. 1, there are four seismic sensor streamers 20 towed by the seismic vessel 10. The number of seismic sensor streamers may be different in any particular implementation of a survey system according to the various aspects of the invention, therefore, the number of streamers such as shown in FIG. 1 is not intended to limit the scope of the invention. As explained in the Background Art section herein, in seismic acquisition systems such as shown in FIG. 1 that include a plurality of laterally spaced apart streamers, the streamers 20 are coupled to towing equipment that secures the forward ends of the streamers 20 at selected lateral positions with respect to each other and with respect to the seismic vessel 10. As shown in FIG. 1, the towing equipment can include two paravane tow ropes 8 each coupled to the vessel 10 at one end through a winch 19 or similar spooling device that enables changing the deployed length of each paravane tow rope 8. The distal end of each paravane tow rope 8 is functionally coupled to a paravane 14. The paravanes 14 are each shaped to provide a lateral component of motion to the various towing components deployed in the water 11 when the paravanes 14 are moved through the water 11. Lateral in the present context means transverse to the direction of motion of the vessel 10. The lateral motion component of each paravane 14 is opposed to that of the other paravane 14, and is generally in a direction transverse to the centerline of the vessel 10. The combined lateral motion of the paravanes 14 separates the paravanes 14 from each other until they put into tension one or more spreader ropes or cables 24, functionally coupled end to end between the paravanes 14.

The streamers 20 are each coupled, at the axial end thereof nearest the vessel 10 ("forward end"), to a respective lead-in cable termination 20A. The lead-in cable terminations 20A are coupled to or are associated with the spreader ropes or cables 24 so as to fix the lateral positions of the streamers 20 with respect to each other and with respect to the vessel 10. Electrical and/or optical connection between the appropriate components in the recording system 12 and, ultimately, the sensors 22 (and/or other circuitry) in the ones of the streamers 20 inward of the lateral edges of the system may be made using inner lead-in cables 18, each of which terminates in a respective lead-in cable termination 20A. A lead-in termination 20A is disposed at the vessel end of each streamer 20. Corresponding electrical and/or optical connection between the appropriate components of the recording unit 12 and the sensors in the laterally outermost streamers 20 may be made through respective lead-in terminations 20A, using outermost lead-in cables 16. Each of the inner lead-in cables 18 and outermost lead-in cables 16 may be deployed by a respective winch 19 or similar spooling device such that the deployed length of each cable 16, 18 can be changed.

As is known in the art, the streamers 20 may each be assembled from a plurality of streamer segments coupled end to end. See, for example, U.S. Patent Application Publication No. 2007/0064528 filed by Metzbower et al. and assigned to the assignee of the present invention. The streamer segments may include couplings at the longitudinal ends thereof configured to join the segments end to end.

The system shown in FIG. 1 also includes a plurality of single-foil LFD control devices 26 cooperatively engaged with each of the streamers 20 at selected positions along each streamer 20. As will be further explained, each LFD control device 26 includes a single control surface or "foil" that when moved to a selected rotary orientation and selected angle of attack (angle subtended between a direction of motion of the LFD through the water and an effective thrust plane of the foil) with respect to the direction of movement of such surface through the water 11 creates a hydrodynamic lift in a selected direction to urge the streamer 20 in any selected direction upward or downward in the water 11 or transverse to the direction of motion of the vessel. Thus, such LFD control devices 26 can be used to maintain the streamers in a selected geometric arrangement.

Figure 2:
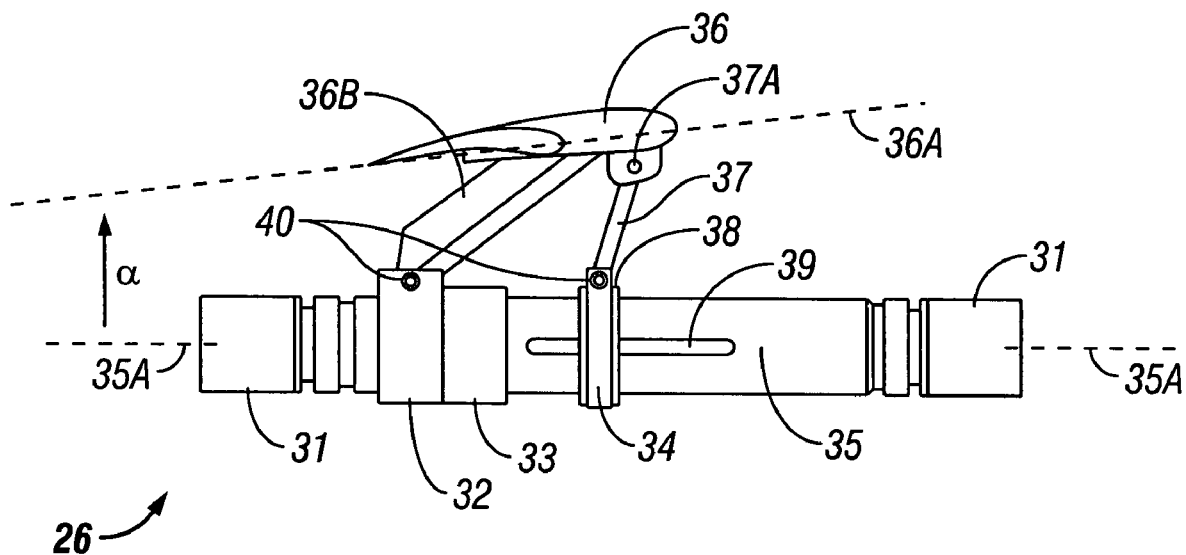
FIG. 2 shows a side view of one example of an LFD control device.

One example of an LFD control device is shown in side view in FIG. 2. The LFD control device 26 may include a generally cylindrically shaped housing 35. The housing 35 may be made from steel or other high strength metal, and in some examples may be made from non-ferromagnetic metal such as titanium, stainless steel, model or an alloy sold under the trademark INCONEL, which is a registered trademark of Huntington Alloys Corporation, Huntington, W. Va. The housing 35 includes connectors 31 at its longitudinal ends configured to couple to corresponding connectors (not shown) disposed at the longitudinal ends of adjacent streamer segments, as explained above with reference to the Metzbower et al. '528 patent application publication. A single control surface or foil 36 is mounted to the housing 35 in a manner that will be further explained below. The foil 36 can extend laterally substantially perpendicularly with respect to the plane of the view shown in FIG. 2. The foil 36 may be hydrodynamically shaped to enable relatively low friction movement through the water, and may be shaped to provide hydrodynamic lift in a direction perpendicular to a plane shown generally at 36A in FIG. 2.

The foil 36 can be mounted to the housing 35 such that the plane 36A may subtend a selectable angle α ("angle of attack") with respect to the longitudinal axis 35A of the housing 35. The foil 36 may also be mounted such that the foil 36 may be moved to any rotary orientation about the housing 35. Thus, hydrodynamic lift may be selectively provided in any rotary orientation by selecting the rotary orientation of the foil 36 about the housing 35 and by selecting the angle of attack α. In the present example, such functionality may be provided by the following components.

The foil 36 may be coupled proximate one end (in the example of FIG. 2 its aft end) to the housing 35 using a strut 36B that fixes the aft end of the foil 36 at a selected lateral distance from the housing 35. The strut 36B may be coupled to the housing 35 by a pivot 40 such that the foil 36 may be moved at its forward end to rotate the plane 36A. The pivot 40 can be disposed in a turn ring 32. The turn ring 32 is rotatably mounted on the exterior of the housing 35 and can be coupled to the rotor of a direct drive torque motor 33, the stator (FIG. 6) of which is affixed to the exterior of the housing 35 as shown in FIG. 2. Operation of the direct drive torque motor 33 will be further explained below; however, rotation of the turn ring 32 by operation of the motor 33 will cause the strut 36B and consequently the foil 36 to move to a selected rotary orientation about the housing 35. Alternatively, although not shown in FIG. 2, the pivot 40 may be disposed between the foil 36 and the strut 36B, and the strut 36B may be fixedly attached to the turn ring 32.

The forward end of the foil 36 may be coupled through a hinge 37A to a link 37. The link 37 may be coupled through a pivot 40 to a thrust ring 34 that is rotatably mounted to the exterior of an actuator ring 38. The actuator ring 38 is longitudinally movable along the housing 35. The thrust ring 34 may be mounted to the actuator ring 38 using needle bearings, journal bearings or any similar device to enable relatively free rotation of the thrust ring 34 about the actuator ring 38, while transferring linear motion of the actuator ring 38 along the housing 35 to the thrust ring 34. One example of operation of the actuator ring 38 will be explained below with reference to FIG. 3. Longitudinal movement of the actuator ring 38 (and corresponding motion of the thrust ring 34) will cause the effective lateral extension of the link 37 (the component of its length perpendicular to the longitudinal axis 35A of the housing 35) to change. By changing the effective lateral extension of the link 37, the plane 36A of the foil 36 may be moved so that the angle of attack α is changed. By making the angle of attack α larger, the amount of hydrodynamic lift may be increased. During operation, the angle of attack α will be selected to provide a selected amount of hydrodynamic lift, and the rotary orientation will be selected to provide such lift in a selected direction.

The diameter of the housing 35, the thrust ring 34 and the direct drive torque motor 33 components may be selected such that when the foil 36 is disengaged from the LFD device 26, the remaining components of the LFD device 26 may be readily spooled onto the winch (19 in FIG. 1) used to deploy the streamer (20 in FIG. 1).

Figure 5:
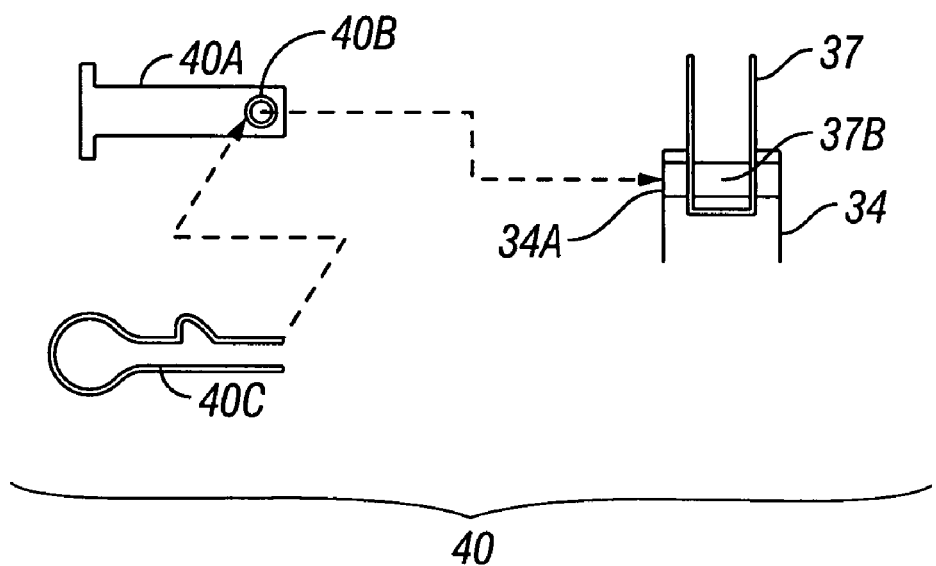
FIG. 5 shows one example of pivots that are readily removable to enable quick installation and removal of the foil.

In the example shown in FIG. 2, during deployment of the LFD device 26, the foil 36 may be coupled to the turn ring 32 and the thrust ring 34 by inserting the pivots 40. Preferably the pivots 40 are configured such that insertion thereof may be effected by hand or with simple hand tools. Thus, as the streamer is unspooled from the winch (19 in FIG. 1), the foil 36 may be coupled to the turn ring 32 and thrust ring 34 at a selected assembly place on the seismic vessel. Alternatively, such assembly may be automatic. During retrieval of the streamer from the water, at a selected assembly point on the seismic vessel, the foil 36 may be removed by withdrawing the pivots 40, thus enabling the streamer to be spooled onto the winch without the need to remove the housing 35 from the streamer. An example of readily removable, quickly installable pivot is shown in FIG. 5, which includes a clevis pin 40A having an opening 40B proximate one end to enable insertion of a locking spring pin 40C. The clevis pin 40A may be inserted in corresponding openings 37B in the link 37 and, as shown at 34A, in the thrust ring 34 when the clevis pin 40A is inserted therethrough, the link 37 becomes pivotally affixed to the thrust ring 34. Corresponding structures may be used to secure the strut (36B in FIG. 2) to the rotor (32 in FIG. 2).

Figure 3:
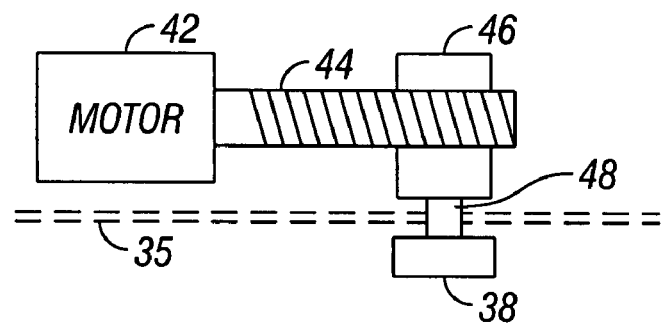
FIG. 3 shows one example of a linear actuator used to change an angle of attack of a foil in the LFD device of FIG. 2.

Returning to FIG. 2, a linear actuator (not shown in FIG. 2) may be disposed within a slot 39 formed in the housing 35. The linear actuator moves the actuator ring 38 longitudinally along the housing 35. Referring to FIG. 3, one example of a linear actuator may include a motor 42 such as an electric motor. The motor 42 and other components explained as follows may be disposed within the slot (39 in FIG. 2). The rotational output of the motor 42 may be coupled to a screw or worm gear 44. Rotation of the worm gear 44 may be converted into linear motion by affixing a ball nut 46 or similar device to the worm gear 44. A ball nut is described, for example, in U.S. Pat. No. 6,233,828 issued to Reguerio. A pin 48 may couple the ball nut 46 to the actuator ring 38. Thus, in combination, operating the direct drive torque motor (32 and 33 in FIG. 2) and the linear actuator as explained above with reference to FIG. 3, the foil (36 in FIG. 2) may be moved to provide a selected amount of hydrodynamic lift along a selected rotary orientation with respect to the streamer (10 in FIG. 1). The lift may be selected to move the streamer to and to maintain the streamer at a selected depth in the water and at a selected relative position with respect to the seismic vessel and the other streamers in the acquisition system. By maintaining such relative positioning, the geometry of the streamers may be more precisely maintained.

Figure 4:
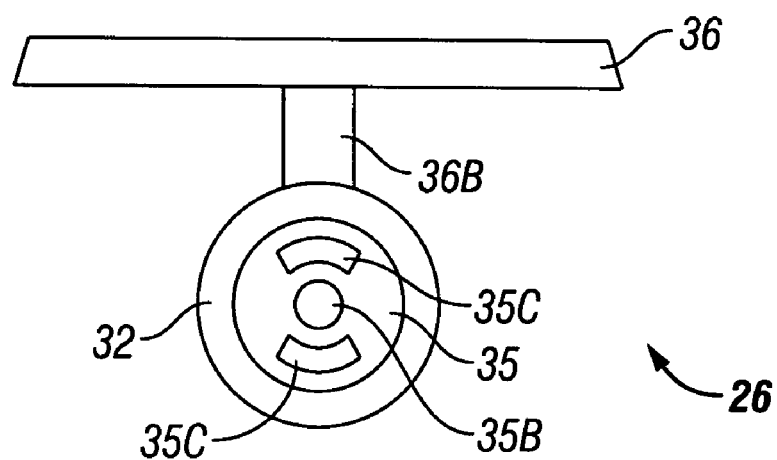
FIG. 4 shows an end view of the LFD device shown in FIG. 2.

An end (rear) view of the LFD control device 26 is shown in FIG. 4. The foil 36 and strut 36B are shown coupled to the rotor 32. The foil 36 is shown as extending laterally substantially symmetrically from either side of the strut 36B. The housing 35 may include a central through bore or passage 35B wherein the screw/worm gear combination (FIG. 3) may be disposed. The housing 35 may also define one or more interior chambers 35C wherein may be installed various electronic components, explained in more detail below with reference to FIG. 7, as well as a cable (not shown) for power and/or signal communication along the streamer.

Figure 6:
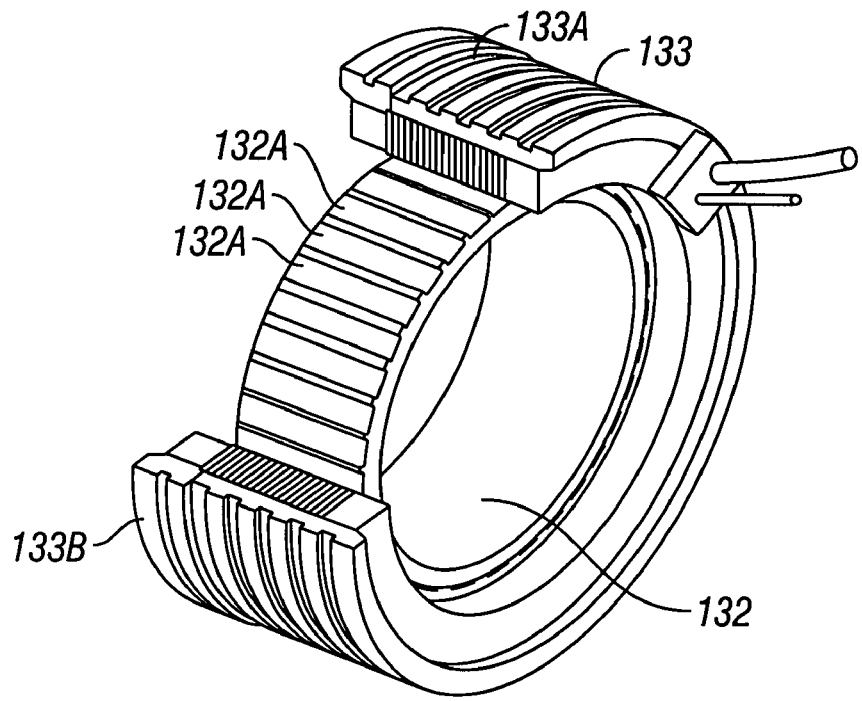
FIG. 6 shows one example of a direct drive torque motor.

One example of a structure of a commercially available direct drive torque motor is shown in FIG. 6 to illustrate the principal components thereof. The motor includes the stator 133, which may be a longitudinally wound wire coil 133A disposed on a substantially cylindrical frame 133B. The rotor 132 may consist of a plurality of permanent magnets 132A arranged longitudinally around the circumference of the rotor 132 and arranged to rotate inside the stator 133. Those skilled in the art will appreciate that the rotor 132 and stator 133 may include longitudinally extending components (not shown) to connect the stator 133 to the housing (35 in FIG. 2) and to connect the rotor 132 to the turn ring (32 in FIG. 2) to enable free rotation thereof around the housing (35 in FIG. 2). Possible advantages of using a direct drive torque motor, also known as a DC brushless synchronous motor, include shot axial length, relatively large diameter and the possibility of a large internal opening in the rotor to enable the entire motor to be affixed outside the housing (35 in FIG. 2). Another possible advantage is that such motors have a small time constant as contrasted with other types of servomotors, and so can respond rapidly and precisely to control signals generated by a microprocessor based controller, explained below with reference to FIG. 7. It will also be appreciated by those skilled in the art that the relative arrangement of the rotor 132 with respect to the stator 133 shown in FIG. 6 may be reversed, such that the stator is disposed inside the rotor.

Figure 7:
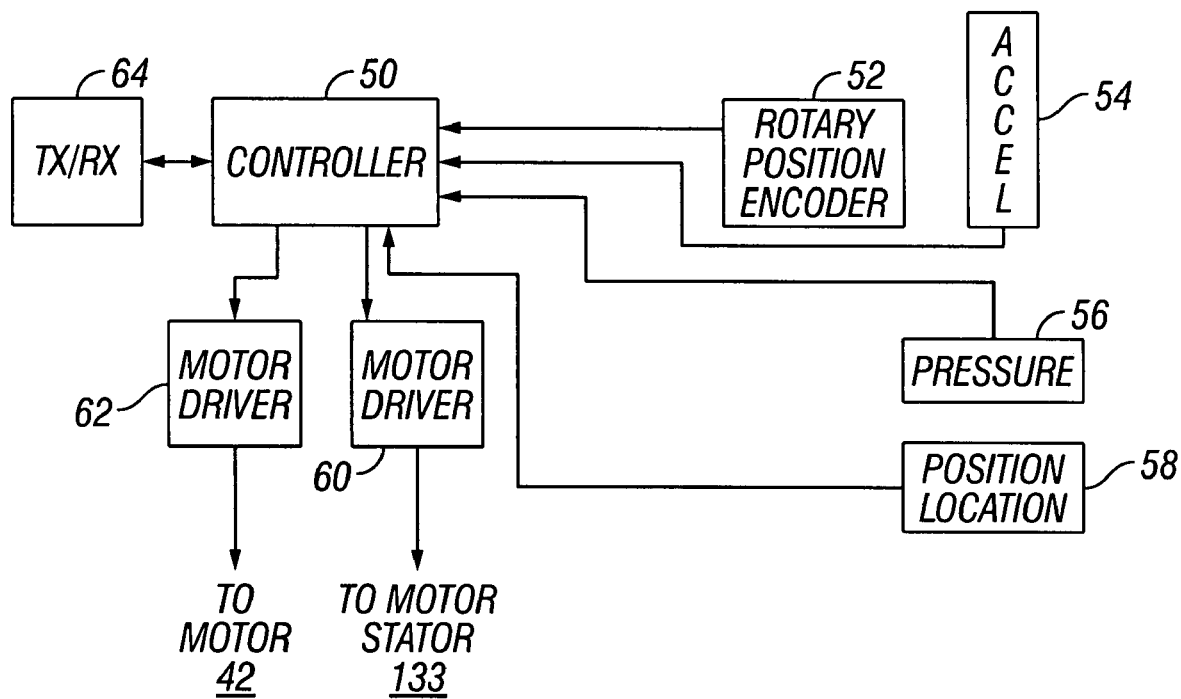
FIG. 7 shows one example of control circuitry that may be used with an LFD device.

FIG. 7 shows one example of circuitry that may be used with the LFD device to control the lateral position and the depth of the streamer at the position of the LFD device. The circuitry may be disposed in one or more of the chambers (35C in FIG. 4) within the housing (35 in FIG. 2). Operation of all the components of the circuitry may be controlled by a microprocessor based controller 50. The controller 50 may be in signal, communication with the recording unit (12 in FIG. 1) using a telemetry transceiver 64. The transceiver 64 may be wireless (if a suitable above water surface exposed antenna is used) or may be coupled to one or more signal lines (not shown) passing through the LFD device as part of the ordinary power and signal communication cabling in the streamer. The transceiver 64 receives command signals from the recording unit (12 in FIG. 1) and transmits data signals from the controller 50 related to various operating parameters of the LFD device. The controller 50 may accept as input signals from various sensors including a rotary position encoder 52, which may be an optical encoder functionally coupled to the turn ring (132 in FIG. 6) to enable determining the rotary orientation of the turn ring (132 in FIG. 6) at any instant, and thus determine the rotary orientation of the strut (36B in FIG. 2) and attached foil (36 in FIG. 2) with respect to the housing (35 in FIG. 2). A pressure sensor 56 in signal communication with the controller 50 may be used to determine the water depth of the LFD device. An accelerometer 54 in signal communication with the controller 50 may be used to determine rotary orientation of the housing (35 in FIG. 2) with respect to Earth's gravity. When signals from the accelerometer 54 are combined with signals from the encoder 52 in the controller 50, the rotary orientation of the foil (36 in FIG. 2) may ultimately be determined with respect to Earth's gravity. Such sensor arrangement may be provided to minimize the effect of any torque acting on the streamer during operation which would tend to rotate the housing (35 in FIG. 2). A position sensor 58, which may be a global positioning satellite receiver (if a suitable above water surface exposed antenna is used), or an acoustic range finder (used to estimate distance to the adjacent streamers) may also be in signal communication with the controller 50. Control outputs of the controller 50 may operate a first motor driver 62 functionally coupled to the actuator motor (42 in FIG. 3). The controller 50 may also operate a second motor driver 60 functionally coupled to the stator (133 in FIG. 6) of the direct drive torque motor (33 in FIG. 2).

In operation, the controller 50 responds to signals from the sensors described above and may operate the actuator motor (42 in FIG. 3) and the torque drive motor to move the foil (36 in FIG. 2) to a selected rotary orientation with respect to gravity and to a selected angle of attack such that the LFD device will move the streamer to a selected depth and lateral position with respect to the seismic vessel and/or adjacent streamers. Such movement may be automatic, if suitable programming is provided to the controller 50, and/or may be provided by signals communicated from the recording system (12 in FIG. 1).

Embodiments of a LFD control device according to the various aspects of the invention may provide improved control over geodetic direction, relative lateral position and depth of a streamer so as to better maintain geometry of a seismic data sensor array, while presenting fewer obstacles to deployment and retrieval of seismic streamers.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A lateral force and depth control device for a marine streamer, comprising:
    a housing configured to be coupled within the streamer;
    a single control surface mounted to the housing such that a rotary orientation and an angle of attack of the control surface with respect to the housing are changeable, the single control surface extending laterally outward from the housing in both directions;
    means for moving the control surface to a selected rotary orientation with respect to the housing;
    means for moving the control surface to a selected angle of attack with respect to the housing; and
    a removable coupling to couple the control surface to the means for moving to a selected rotary orientation and to the means for moving to a selected angle of attack.

2. The device of claim 1 wherein the means for moving to a selected rotary orientation comprises a direct drive torque motor.

3. The device of claim 1 further comprising a rotary encoder functionally coupled to the means for moving to a selected rotary orientation, the rotary encoder in signal communication with a controller, the controller configured to cause the means for moving to a selected rotary orientation to move the control surface to the selected rotary orientation.

4. The device of claim 3 wherein the controller is configured to maintain the selected rotary orientation in response to position signals from a position location sensor.

5. The device of claim 4 wherein the controller is configured to maintain the selected rotary orientation with respect to Earth's gravity in response to signals from an accelerometer in signal communication with the controller.

6. The device of claim 3 wherein the controller is configured to maintain the selected rotary orientation in response to pressure signals from a pressure sensor in signal communication with the controller.

7. The device of claim 1 wherein he means for moving to a selected angle of attack comprises a linear actuator.

8. The device of claim 7 wherein the linear actuator is coupled at the output thereof to a thrust ring configured to move longitudinally along the housing, the thrust ring coupled to one end of a link, the link coupled at another end to the control surface, such that longitudinal motion of the thrust ring changes the angle of attack of the control surface.

9. A marine seismic acquisition system comprising:
a seismic vessel;
a plurality of seismic streamers each coupled at a forward end to towing equipment coupled to the seismic vessel, the towing equipment maintaining the forward ends of the streamers at selected lateral positions behind the vessel, the streamers each including a plurality of seismic sensors thereon at spaced apart positions, the streamers each including at least one lateral force and depth control device at a selected longitudinal position along the streamer, each device including
a housing configured to be coupled within the streamer;
a single control surface mounted to the housing such that a rotary orientation and an angle of attack of the control surface with respect to the housing are changeable, the control surface extending laterally outward from the housing in both directions;
means for moving the control surface to a selected rotary orientation with respect to the housing;
means for moving the control surface to a selected angle of attack with respect to the housing and
a removable coupling to couple the control surface to the means for moving to a selected rotary orientation and to the means for moving to a selected angle of attack.

10. The system of claim 9 wherein each means for moving to a selected rotary orientation comprises a direct drive torque motor.

11. The system of claim 9 wherein each device further includes a rotary encoder functionally coupled to the means for moving to a selected rotary orientation, the rotary encoder in signal communication with a controller, the controller configured to cause the means for moving to a selected rotary orientation to move the control surface to the selected rotary orientation.

12. The system of claim 11 wherein the controller is configured to maintain the selected rotary orientation in response to position signals from a position location sensor.

13. The system of claim 12 wherein the controller is configured to maintain the selected rotary orientation with respect to Earth's gravity in response to signals from an accelerometer in signal communication with the controller.

14. The system of claim 13 wherein the controller is configured to maintain the selected rotary orientation in response to pressure signals from a pressure sensor in signal communication with the controller.

15. The system of claim 9 wherein each means for moving to a selected angle of attack comprises a linear actuator.

16. The system of claim 15 wherein the linear actuator is coupled at the output thereof to a thrust ring configured to move longitudinally along the housing, the thrust ring coupled to one end of a link, the link coupled at another end to the control surface, such that longitudinal motion of the thrust ring changes the angle of attack of the control surface.

* * * * *